UNITED STATES PATENT OFFICE.

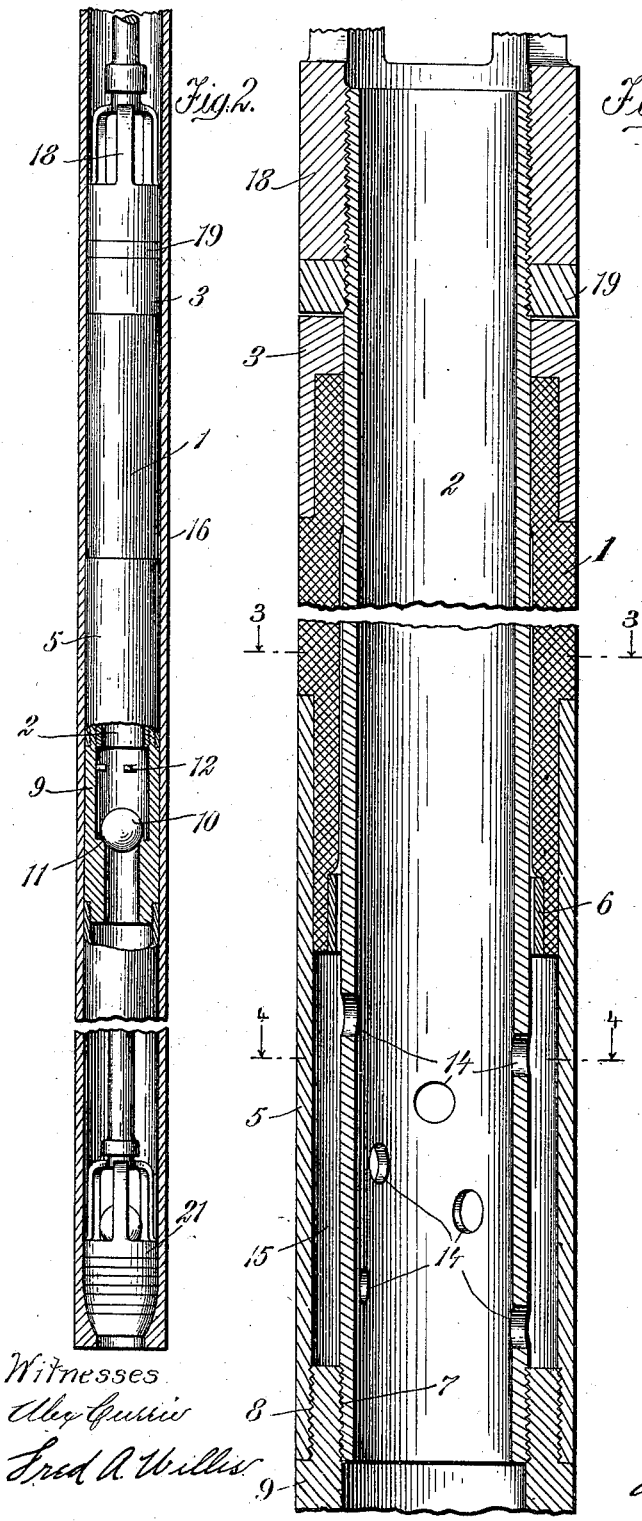

OTTO J. KELLER, OF LOS ANGELES, CALIFORNIA.

PUMP-PLUNGER.

977,881.          Specification of Letters Patent.      Patented Dec. 6, 1910.

Application filed January 14, 1910. Serial No. 538,115.

*To all whom it may concern:*

Be it known that I, OTTO J. KELLER, a citizen of the United States of America, residing at Los Angeles, in the county of Los Angeles, State of California, have invented a certain new and useful Pump-Plunger; and I do hereby declare the following to be a full, clear, and exact description of the invention, such as will enable others skilled in the art to which it appertains to make and use the same.

This invention relates to a pump plunger; more particularly to a fluid-pressure packing which is especially adapted for use in connection with a plunger in a deep well pump, and consists in the peculiar construction, combination and arrangement of the parts as set forth hereinafter.

One object of the invention is to provide a packing which shall expand evenly into contact with the barrel of the pump to prevent leakage or the formation of pockets which trap the fluid.

Another object of the invention is to provide a packing for a plunger which shall be subject to pressure by fluid on its inner side only and which shall be durable and efficient in use, easily replaced when worn, and economical of power in operation.

Other objects and the advantages of the invention will be apparent to those skilled in the art from a consideration of the following description of one form of construction in which it may be embodied taken in connection with the accompanying drawings, of which, Figure 1 is a sectional elevation of a pump plunger having the invention embodied therein. Fig. 2 is a sectional elevation of a portion of the working barrel of a pump, showing the plunger and standing valve in position therein. Fig. 3 is a horizontal section on line 3—3 Fig. 1, and Fig. 4 is a horizontal section on line 4—4 Fig. 1.

Referring now to the drawings, 1 indicates the packing which may be of any approved material and which encircles the tube 2. This packing is preferably secured tightly at its upper end to tube 2, this tight connection being effected by vulcanizing the packing to the tube or in any other desired manner. A ferrule 3 may be placed over the upper end of packing 1 to aid in effecting this tight connection and to prevent the upper end of the packing from being injured.

As shown in the drawings, packing 1, with the exception of the part near the top, is loose on tube 2; sufficient space being left between the packing and the tube to permit of liquid passing up between them. Packing 1 is secured at its lower end by vulcanizing or in other suitable manner, on the inside of the upper end of a sleeve 5. A ring 6 of suitable material may be placed inside packing 1, between the latter and tube 2, and expanded therein by any well-known means to protect the lower edge of the packing and further assure of no liquid passing between sleeve 5 and packing 1.

Tube 2 and sleeve 5 preferably extend downwardly below packing 1 and may be secured by external and internal threads 7 and 8, respectively, to a valve casing 9 which may be of ordinary construction as it forms no part of this invention. The valve casing here illustrated contains a ball valve 10 seating on a seat 11, lugs 12 serving to retain it within the casing on the downward stroke of the plunger.

Tube 2 may be formed with one or more perforations 14, preferably placed in that portion thereof extending below packing 1, the purpose of which is to permit a portion of the liquid being pumped passing into the space 15 between the lower ends of tube 2 and sleeve 5 and thence into the space between the tube and the packing 1 which will cause the latter to expand and press against the barrel, indicated at 16 (Fig. 2) of the pump. The reason for the particular location of perforations 14 is that the liquid is thereby caused to enter the space between packing 1 and tube 2 uniformly around the whole periphery thereof which causes a uniform pressure by the column of liquid to be exerted on the packing to press it evenly into contact with the working barrel and thereby increasing the efficiency of the packing and permitting it to be used longer without renewal.

18 indicates a cage of ordinary construction which is adapted to be screwed over the upper end of tube 2 and has the lower end of the usual sucker rod connected at its upper end. A lock nut 19 may be provided to lock cage 18 on tube 2. The outside peripheries of the lower portion of cage 18, when it is screwed on tube 2, and of lock nut 19 and ferrule 3 are preferably cylindrical and of a diameter equal to the normal outside diameter of packing 2. This construction, which the particular manner of expanding the packing permits, also tends to lengthen the life of the packing as it then presents no exposed shoulder to be frayed and worn by the weight of the liquid bearing down on it. The standing valve 21, shown in the lower end of barrel 16 of the pump is of usual construction and forms no part of the invention.

The manner of action of packing means constructed according to this invention is believed to be clearly brought out from the foregoing description as it will be easily seen that a portion of the liquid being lifted by the plunger will pass through perforations 14 and into the space between packing 1 and tube 2, the weight of the liquid in the barrel 16 above the plunger causing the packing to be expanded evenly into contact with the barrel to prevent the leakage of liquid therebetween or the formation of pockets to trap the fluid.

Although one form of construction in which the invention may be embodied has been illustrated and described, it is obvious that various changes and modifications may be made therein and the right is reserved to all such changes and modifications as come within the spirit and scope of the invention as defined in the appended claims.

I claim:

1. In a pump plunger, in combination, a tube, a fluid-pressure packing encircling said tube, said tube extending beyond said packing, a sleeve connected to the packing and encircling and spaced from the extended portion of the tube, and means permitting the passage of fluid from the tube to the space between the latter and the sleeve and thence to the space between the tube and packing.

2. In a pump plunger, in combination, a tube, a fluid-pressure packing encircling said tube, said tube having a portion thereof extending beyond the packing, said extended portion being perforated, and a sleeve encircling said perforated portion of the tube, said packing and sleeve being spaced from said tube to permit passage of fluid from the perforations in said tube to said packing.

3. In a pump plunger, in combination, a tube, a fluid-pressure packing encircling said tube and connected to it at one end, said tube having a portion thereof extending beyond the packing, said extended portion being formed with perforations, and a sleeve connected to the packing at the other end and encircling the perforated portion of the tube, said packing and sleeve being of sufficient inside diameter to leave a space therebetween and the tube.

4. In a pump plunger, in combination, a tube, a fluid-pressure packing encircling said tube and connected to it at its upper end, said tube having a portion extending below the packing, said extended portion being formed with perforations, a ferrule inclosing the upper end of the packing, a sleeve inclosing the lower end of the packing and also encircling the perforated portion of the tube, said packing and sleeve being spaced from said tube to permit passage of fluid from the perforations in said tube to the space between the latter and the sleeve and thence to the packing, and means for holding the inclosed lower end of the packing tightly against the sleeve.

5. In a pump plunger, the combination, a tube, a fluid-pressure packing loosely encircling said tube and connected to it at its upper end, said tube having a portion extending below the packing, said extended portion being formed with perforations, a ferrule inclosing the upper end of the packing, a sleeve inclosing the lower end of the packing and also loosely encircling the perforated portion of the tube, an expanded ring placed within the lower end of the packing to force it against the sleeve, and means for closing the space between the lower ends of the tube and sleeve.

In testimony whereof, I have signed my name to this specification in the presence of two subscribing witnesses at Los Angeles, county of Los Angeles, State of California, this 7th day of January A. D. 1910.

OTTO J. KELLER

Witnesses:
 EDWARD F. KELLER,
 ALEX CURRIE.